July 28, 1942.  R. R. PALLADY  2,291,056
COMPOUND HYDRAULIC BRAKE MASTER CYLINDER
Filed Jan. 31, 1941  2 Sheets-Sheet 2

WITNESS
H. Woodard

INVENTOR
Roy R. Pallady
By H. B. Wilson & Co.
Attorneys

Patented July 28, 1942

2,291,056

UNITED STATES PATENT OFFICE 2,291,056

COMPOUND HYDRAULIC BRAKE MASTER CYLINDER

Roy R. Pallady, Oklahoma City, Okla.

Application January 31, 1941, Serial No. 376,925

3 Claims. (Cl. 60—54.6)

The invention aims to provide a new and improved compound master cylinder for hydraulic brakes, of such construction that the initial push on the brake pedal will rapidly move a relatively large quantity of the brake fluid to quickly move the brake shoes into contact with the drums, and in which the continued push on the pedal will move the brake fluid with less speed but more power to effectively apply the brakes, thereby permitting quick and effective brake application with relatively slight pedal pressure.

With the foregoing in view, the invention resides in the novel subject matter hereinafter described and claimed, description being accomplished by reference to the accompanying drawings.

Figure 4 is a detail transverse sectional view on line 4—4 of Fig. 1.

Figure 1:
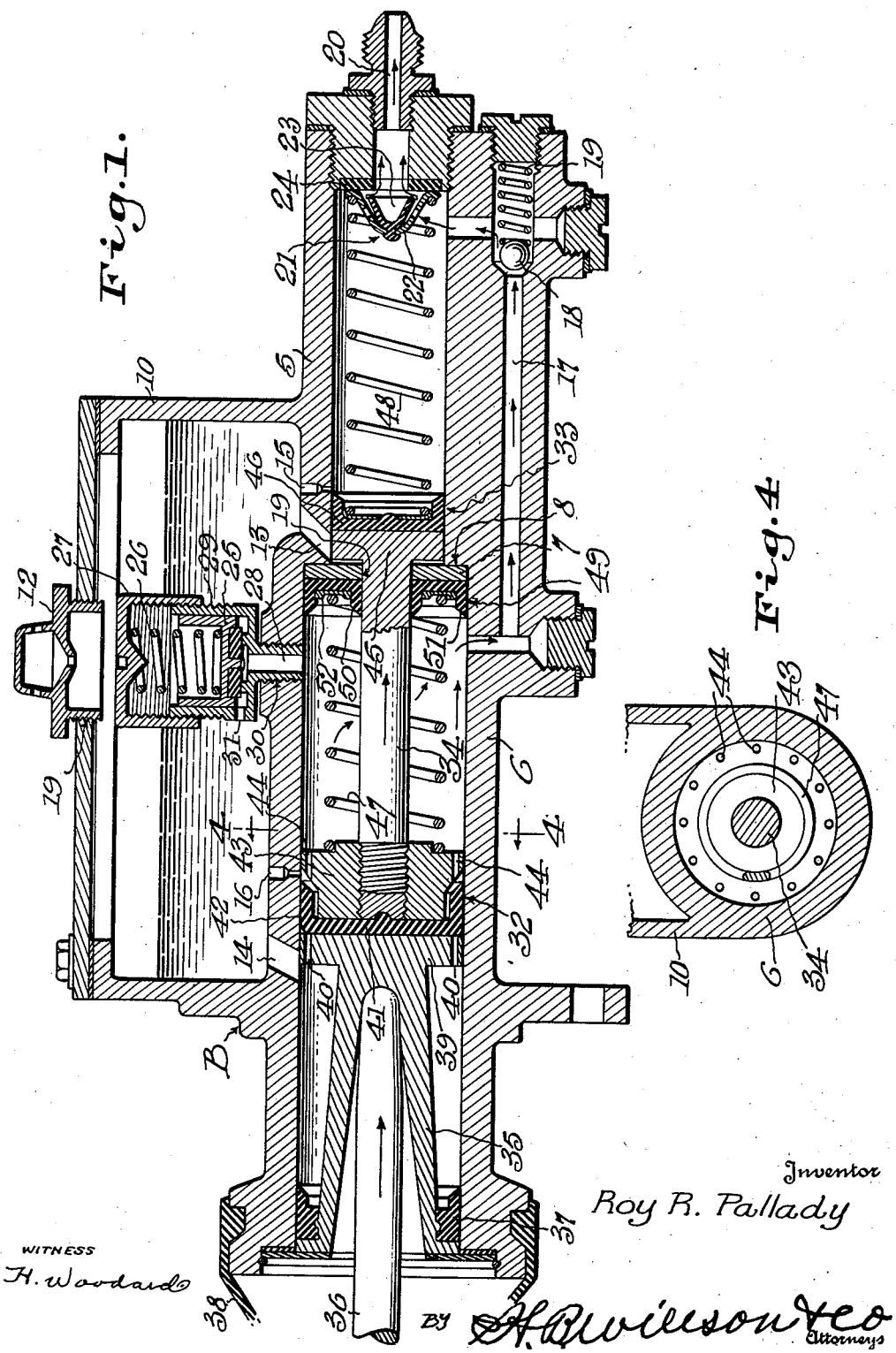
Figure 1 is a longitudinal sectional view, the parts being shown in the relative positions which they assume when the brake pedal is started forwardly.

The construction disclosed has proven to be of great advantage in actual installations and may, therefore, be considered as preferred, with the understanding, however, that variations may be made within the scope of the invention as claimed, even though the illustrated structure will be rather specifically described.

The master cylinder body B includes a comparatively small front cylinder 5 and a relatively large rear cylinder 6, said body being provided with a transverse partition 7 between said cylinders. This partition bears against a rearwardly facing shoulder 8 formed at the juncture of the two cylinders 5 and 6, and said partition is formed with a central aperture 9 for a purpose to appear. The body B is also provided with a fluid reservoir 10 on top of the cylinders 5 and 6, said reservoir having a filling opening 11 in its top, closed by the customary vented plug 12. The reservoir 10 is in constant communication with the rear portions of the front and rear cylinders 5 and 6, by means of appropriate ports 13 and 14, respectively, and somewhat in advance of these ports are two relatively small ports 15 and 16 which also establish communication between the rear portions of the cylinders and the reservoir. A longitudinal by-pass 17 extends from the front end of the rear cylinder 6 to the front end of the front cylinder 5, said by-pass being provided with a check valve 18 which closes toward said cylinder 6. A light spring 19 is associated with this valve for instantaneously closing same when pressure conditions within the assembly permit. The front end of the cylinder 5 has a suitable fluid outlet nipple 20 for connection with a brake line, and the interior of the cylinder is provided at said front end with a conventional double check valve assembly 21 which preferably includes an outer apertured metal cup 22 and an inner elastic cup 23, the peripheral edge of said cup 21 being cooperable with an elastic valve seat 24 in the cylinder.

From the front portion of the large rear cylinder 6 I provide a fluid passage to the reservoir 10, and a check valve 25 is employed for said passage, said check valve being closable toward said cylinder 6 and being urged toward closed position by a spring 26. An adjusting device 27 is provided to regulate the strength of this spring, said adjusting device being within the reservoir 10 directly under the filling opening 11, so as to be accessible through this opening. In the present disclosure, the passage controlled by the check valve 25, includes a port 28 in a nipple which projects downwardly from a metal cup 29, said nipple being threaded into an opening 30 in the top of the rear cylinder 6. The passage also includes a portion of the interior of this cup 27, and one or more radial ports 31 which extend from said interior of the cup to the exterior thereof. The check valve 25 is slidable within the cup 29 and the adjusting device 27 is in the form of a cap threaded upon said cup, said cup and cap jointly forming a casing for said valve and its spring 26. It may here be stated that considerably more fluid pressure is required to open check valve 25, than that required to open the first mentioned check valve 18.

A rear piston 32 in the cylinder 6 and a front piston 33 in the cylinder 5 are operatively connected by a piston rod 34 which passes substantially fluid-tightly through the opening 9 in the partition 7, the rear piston 32 being provided with a rearward extension 35 socketed to engage the usual pedal-actuated push rod 36, said extension 35 being provided with a conventional fluid seal 37 normally seated in the rear extremity of the cylinder 6. The member 38 shown surrounding this extremity is simply a portion of the conventional flexible bellows for exclusion of foreign matter.

The rear piston 32 is preferably of the construction now to be described. 39 denotes a piston head on the front end of the extension 35, and 40 has reference to small fluid ports extending from the front to the rear side of said piston head. An elastic piston cup 41 lies against the front side of the piston head 39 and is formed with a forwardly projecting peripheral flange 42 engaging the wall of the rear cylinder 6, said flange being normally located between the ports 14 and 16. A guide member 43 lies against the front side of the cup 41 and is peripherally stepped so that its rear portion is within the confines of the flange 42 and its front portion contacts with the wall of the cylinder 6. The outer step of this guide member is formed with longitudinal ports 44 extending from its front side substantially to the beveled front edge of the flange 42. The guide member 43 is threaded upon the rear end of the piston rod 34 and the front end of this rod is preferably integral with the piston head 45 of the front piston 33, said front piston including an elastic piston cup 46 lying against the front side of said piston head 45. One coiled spring 47 is disposed in the cylinder 6 and thrusts rearwardly against the guide member 43, and another coiled spring 48 is positioned in the cylinder 5 to thrust rearwardly against the piston cup 46. The front end of spring 48 also engages the metal cup 22 of the check valve assembly 21 to hold said cup in yielding contact with its seat 24. The front end of the rear spring 47 is instrumental in holding a sealing ring 49 in place against the rear side of the partition 7. This sealing ring includes an inner continuous flange 50 projecting rearwardly and fluid-tightly surrounding the piston rod 34, and an outer rearwardly projecting continuous flange 51 which fluid-tightly contacts with the wall of the cylinder 6. A washer 52 lies against the rear side of the cup 49 between the flanges 50 and 51, the rear side of said washer being channeled to receive the front extremity of the spring 47.

Figure 2:
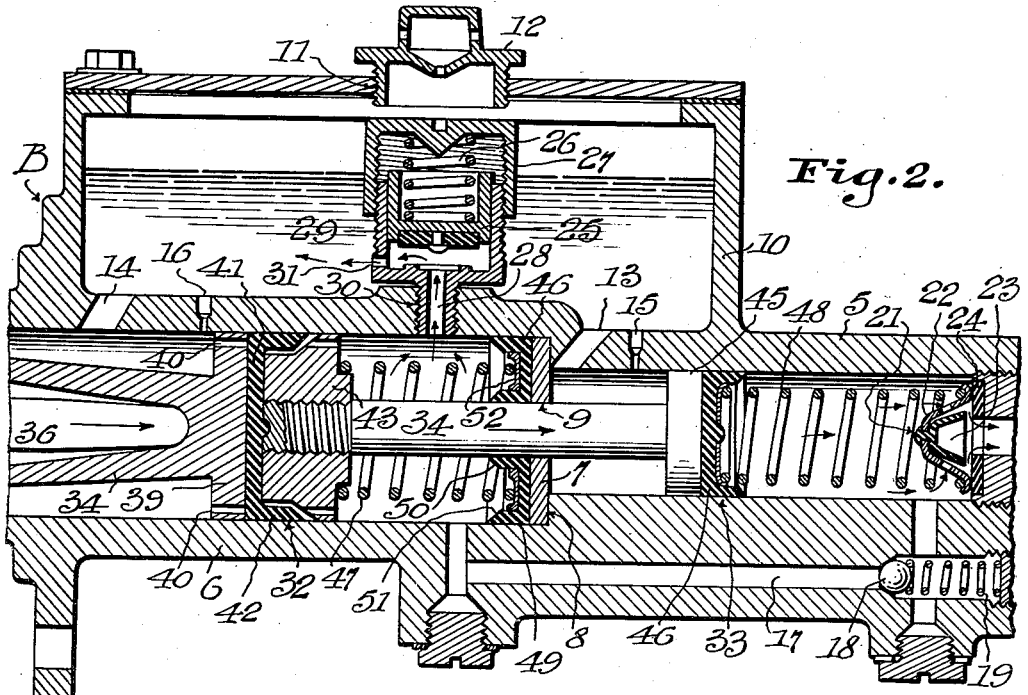
Figure 2 is a fragmentary view similar to the major portion of Figure 1 but illustrating the relation of parts when the brake shoes are being forced more tightly against the drums after initial movement into contact with said drums.

With reference to operation, the initial forward movement of the brake pedal causes the entire piston assembly to move forwardly as a single unit. During this movement, the check valve 25 is held closed by the spring 26, with the result that the rear piston 32 forces fluid through the longitudinal port 17 causing opening of the check valve 18, the fluid then entering the front of the cylinder 5 and passing through the check valve assembly 21 and out through the nipple 20. This fluid is rather rapidly moved by the large rear piston 32 and consequently it quickly moves the brake shoes out against the drums. By the time this has occurred, or immediately after such occurrence, the pressure within the assembly has risen to such an extent that the check valve 25 will open, whereupon check valve 18 will instantaneously close. Continued forward movement of the pistons now permits the small front piston 33 to alone force fluid into the brake line, said fluid being driven from the small cylinder 5 with great power to force the brake shoes tightly against the drum with little pedal effort. While piston 33 is thus operating, the fluid in front of the rear piston 32 simply passes through the port 28 into the metal cup 29 (see Fig. 2) and from this cup into the reservoir through the radial ports 31.

Figure 3:
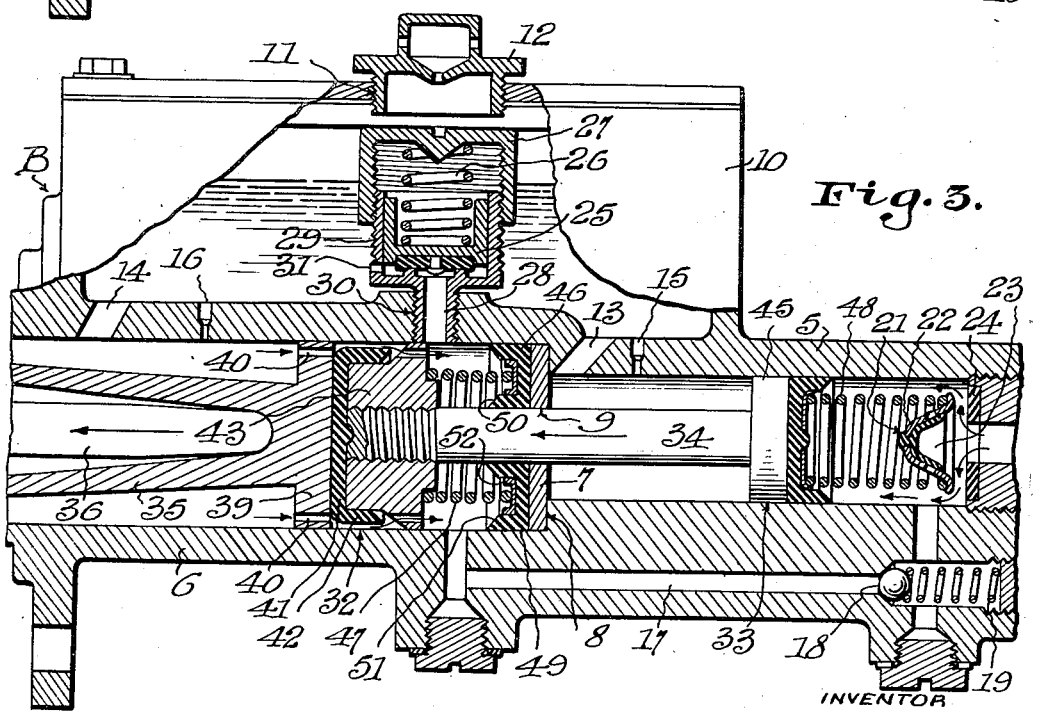
Figure 3 is a view similar to Fig. 2 but illustrating the manner in which the fluid returns to the relatively large and small cylinders as the brake pedal moves rearwardly.

When the pedal pressure is released, the springs 47 and 48 return the parts to their normal positions as will be clear from Fig. 3. Fluid from the line returns to the cylinder 5 through the nipple 20, and fluid returns to the rear cylinder 6 as shown by the arrows in Fig. 3. Final filling of both cylinders, when both pistons have returned to their rear extremities, occurs through the ports 15 and 16.

From the foregoing, it will be seen that a novel and advantageous compound master cylinder has been provided which will permit instantaneous brake application with relatively little pedal pressure. All parts are so constructed as to generally facilitate manufacture and repair and to promote long trouble-free life. Moreover, it will be observed that the adjusting device 27 for the spring 26 is readily accessible so that the strength of said spring may be adjusted as required, thus permitting the necessary pressure to be built up to move the brake shoes into contact with the drums without building up excessive pressure and thus resisting pedal movement. By the time more force is necessary to force the shoes tightly against the drums, the required pressure is furnished by the relatively small front piston 33 which requires less pedal pressure than a larger piston.

Attention is again invited to the possibility of making variations within the scope of the invention as claimed.

I claim:

1. A compound hydraulic brake master cylinder comprising a body having a small front cylinder, a large rear cylinder and a fluid reservoir, the bottom of which is formed by said cylinders, said body having a fluid outlet which communicates with the front end of said front cylinder, a double check valve in said front cylinder associated with said fluid outlet, said body being provided with a longitudinal port formed within said body and having its rear end in communication with the front end of said rear cylinder, said longitudinal port having a laterally turned front end within said body and directly communicating with said front end of said front cylinder behind said double check valve, transverse partitioning means in said body forming a front wall for said rear cylinder and a rear wall for said front cylinder, said partitioning means having a central opening and a fluid seal around said opening, a piston rod passing slidably through said opening and disposed in fluid-tight contact with said seal, a small front piston and a large rear piston operatively connected by means of said piston rod and operable in said front and rear cylinders respectively, said pistons having fluid sealing cups, a pressure relief passage within said body and extending from the front end of said rear cylinder to said reservoir, a spring-closed pressure-opened valve for said pressure relief passage mounted within said body and closable toward said rear cylinder, and a check valve within said body and operatively associated with said longitudinal port, said check valve being closable toward said rear cylinder, said body having ports for supplying said cylinders with fluid from said reservoir and including a port from said reservoir to the rear end of said front cylinder to admit fluid between said partitioning means and said front piston as this piston moves forwardly and to conduct the admitted fluid back to the reservoir as said front piston moves rearwardly.

2. In a compound hydraulic brake master cylinder having a front small cylinder, a rear large cylinder, and a partition between said cylinders having a central opening; a rear piston head in sliding contact with the side wall of said rear cylinder, a yieldable piston cup having a flat disk portion lying against the front side of said rear piston head and having a forwardly projecting peripheral flange in sliding contact with said side wall of said rear cylinder, a guide head lying against the front side of said flat disk portion of said piston cup within the confines of said flange, said guide head having an enlarged front end in front of said flange and in sliding contact with said side wall of said rear cylinder, a piston rod secured to said guide head and extending forwardly through said partition opening, a front piston secured to the front end of said rod and operable in said front cylinder, and a return spring acting rearwardly on said guide head.

3. In a compound hydraulic brake master cylinder having a large rear cylinder and a piston therein, a small front cylinder and a piston therein, a partition between said cylinders having a central opening, a piston rod operatively connecting said pistons and extending through said opening, and a coiled compression spring surrounding said rod in said rear cylinder and acting rearwardly against the rear piston; a flexible sealing ring lying against the rear side of said partition and having inner and outer concentric rearwardly projecting flanges, said inner flange being disposed fluid-tightly around said piston rod, said outer flange being disposed fluid-tightly against the inner side of the rear cylinder wall, and a washer lying against the rear side of said flexible sealing ring between said flanges and abutting the rear side of said sealing ring, said washer having a rearwardly open channel receiving the front end of said spring.

ROY R. PALLADY.